United States Patent
Rogers et al.

(10) Patent No.: US 10,931,090 B2
(45) Date of Patent: Feb. 23, 2021

(54) MOUNT WITH CLIP

(71) Applicant: Kiddie Technologies, Inc., Wilson, NC (US)

(72) Inventors: Aaron Stanley Rogers, Surf City, NC (US); Dharmendr Len Seebaluck, Wake Forest, NC (US)

(73) Assignee: Kiddie Technologies, Inc., Wilson, NC (US)

( * ) Notice: Subject to any disclaimer, the term of this patent is extended or adjusted under 35 U.S.C. 154(b) by 995 days.

(21) Appl. No.: 15/451,980

(22) Filed: Mar. 7, 2017

(65) Prior Publication Data

US 2018/0259396 A1 Sep. 13, 2018

(51) Int. Cl.
| | |
|---|---|
| *F16L 3/08* | (2006.01) |
| *H02G 3/32* | (2006.01) |
| *F16L 3/13* | (2006.01) |
| *F16L 3/237* | (2006.01) |
| *F16B 7/04* | (2006.01) |

(52) U.S. Cl.
CPC ............. *H02G 3/32* (2013.01); *F16B 7/0433* (2013.01); *F16L 3/13* (2013.01); *F16L 3/237* (2013.01)

(58) Field of Classification Search
CPC ...... F16L 3/1091; F16L 3/1215; H01B 17/18; E05B 79/12
See application file for complete search history.

(56) References Cited

U.S. PATENT DOCUMENTS

| | | | | |
|---|---|---|---|---|
| 2,616,646 | A | * 11/1952 | Matthysse | ............ F16L 3/1091 |
| | | | | 248/65 |
| 3,054,585 | A | 7/1960 | Roberts et al. | |
| 3,162,788 | A | 12/1964 | Allen et al. | |
| 3,173,987 | A | 3/1965 | Potruch | |
| 4,039,744 | A | * 8/1977 | Seaquist | ............... H01B 17/18 |
| | | | | 174/169 |
| 4,371,137 | A | 2/1983 | Anscher | |
| 4,861,081 | A | * 8/1989 | Satoh | ..................... E05B 79/12 |
| | | | | 292/336.3 |
| 4,865,281 | A | 9/1989 | Wollar | |
| 5,188,318 | A | 2/1993 | Newcomer et al. | |
| 5,199,891 | A | 4/1993 | Reed | |
| 5,494,245 | A | 2/1996 | Suzuki et al. | |
| 5,680,680 | A | 10/1997 | LaConte | |

(Continued)

FOREIGN PATENT DOCUMENTS

| | | | |
|---|---|---|---|
| CN | 203012186 U | 6/2013 | |
| DE | 102014107442 A1 | 12/2015 | |

(Continued)

OTHER PUBLICATIONS

Extended European Search Report, for European Patent Application No. 18153229.2, dated Jun. 29, 2018, 9 pages.

(Continued)

*Primary Examiner* — Amy J. Sterling
(74) *Attorney, Agent, or Firm* — Kinney & Lange, P.A.

(57) ABSTRACT

A mount can include a bracket and a clip. The bracket can include a foot, a riser attached to the foot, and a connecting feature. The clip can include a connection portion for connecting the clip to the bracket, a retention portion with a curved configuration of at least half of a circle, and a tab portion that extends from the retention portion towards the connection portion.

8 Claims, 6 Drawing Sheets

(56) References Cited

U.S. PATENT DOCUMENTS

| | | | |
|---|---|---|---|
| 5,740,994 A | 4/1998 | Laughlin | |
| 5,772,166 A | 6/1998 | Adams | |
| 6,206,331 B1 | 3/2001 | Keith et al. | |
| 6,732,982 B1 | 5/2004 | Messinger | |
| 7,241,071 B2 | 7/2007 | Carraher et al. | |
| 7,394,963 B2 | 7/2008 | Hartlef | |
| 7,832,248 B2 * | 11/2010 | Heath | F16L 3/1215 72/379.2 |
| 8,540,191 B2 | 9/2013 | Sabadie et al. | |
| 8,953,924 B2 | 2/2015 | Cote et al. | |
| 9,382,929 B2 | 7/2016 | Carrillo et al. | |
| 9,463,867 B2 | 10/2016 | Langlade et al. | |
| 2010/0183270 A1 | 7/2010 | Davis et al. | |
| 2010/0295694 A1 | 11/2010 | Kauffman et al. | |
| 2012/0012218 A1 | 1/2012 | Sabadie et al. | |

FOREIGN PATENT DOCUMENTS

| | | |
|---|---|---|
| EP | 2280206 A1 | 2/2011 |
| EP | 2370215 A1 | 10/2011 |
| EP | 1321783 B1 | 7/2012 |
| EP | 2485352 A1 | 8/2012 |
| GB | 1464906 | 2/1977 |

OTHER PUBLICATIONS http://www.conrad-electronic.co.uk/ce/en/product/540299/Panduit-ACC19-AT-CO-Cable-Clip-Self-adhesive.
http://www.homedepot.com/p/Gardner-Bender-3-8-x-1-4-in-One-Hole-Plastic_Cable-Clamp-18-Pack-PPC-1525/100158293.
http://www.mouser.com/ProductDetail/Panduit/ACC62-A-C/?qs+mlzTHGCsgJH88qhVmsFWJQ%3D%3D&gclid+CMLJ3NHHvdECFQUNaQode8sFUg.
Communication Pursuant to Article 94(3) EPC for EP Application No. 18153229.2, dated May 28, 2020, pp. 6.
Communication Pursuant to Article 94(3) EPC for EP Application No. 18153229.2, dated Oct. 4, 2019, pp. 5.

* cited by examiner

MOUNT WITH CLIP

BACKGROUND

The present application is related to mounts for elongated members, and, more specifically, to mounts with at least one clip for linear sensors in aircraft.

Aircraft can include linear sensors and other types of elongated members such as wires, cables, and conduit that are mounted inside of the airframe. These items can be mounted to other aircraft components using fasteners, although often times the items must be removed in order to have service performed on themselves or on other adjacent components. Unfortunately, fasteners are relatively heavy and expensive hardware that require time and tools to remove and install.

SUMMARY

According to one embodiment, a mount can include a bracket and a clip. The bracket can include a foot, a riser attached to the foot, and a connecting feature. The clip can include a connection portion for connecting the clip to the bracket, a retention portion with a curved configuration of at least half of a circle, and a tab portion that extends from the retention portion towards the connection portion.

According to another embodiment, a method of using a mount can include connecting the mount to a component of an aircraft, the mount including a clip with a tab that extends over a connection portion of the clip and extending an elongated member from a first location of the aircraft to a second location of the aircraft. The method can further include inserting a finger between the tab and the connection portion, exerting force on the tab to open the clip, inserting the elongated member into the clip, and ceasing exerting force on the tab to close the clip on the elongated member to secure the elongated member to the component.

According to another embodiment, an aircraft can include an elongated member that extends from one location to another location in the aircraft with a component positioned adjacent to a portion of the elongated member and a mount that is connected to the component. The mount including a clip having a connection portion including a connecting feature for connecting the clip to the component, a retention portion connected to the connection portion, the retention portion having a curved configuration of at least half of a circle, and a tab portion that extends from the retention portion towards the connection portion. The retention portion is clipped on the elongated member to connect the elongated member to the component.

DETAILED DESCRIPTION

Figure 1:
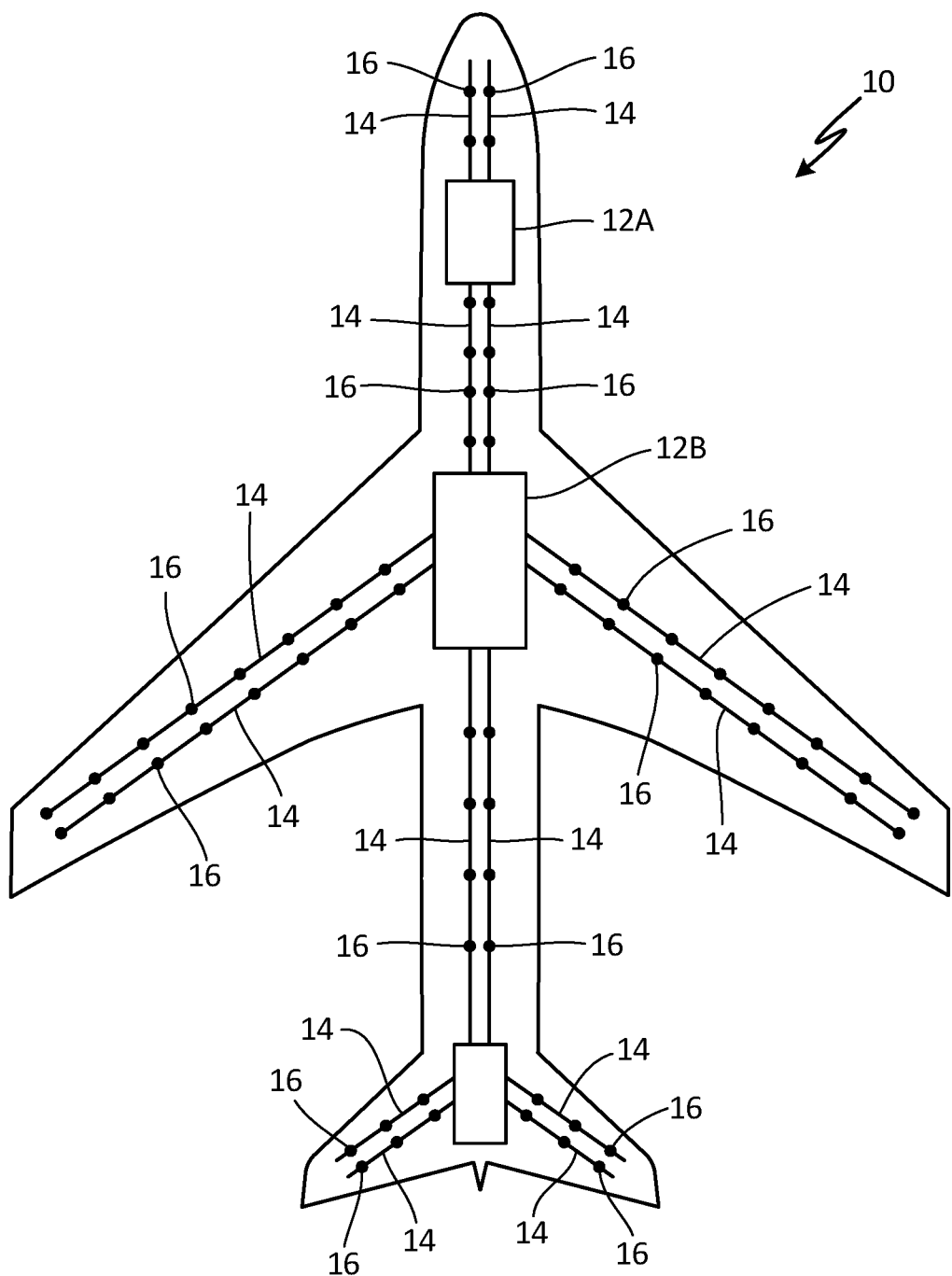
FIG. 1 is a schematic view of an aircraft.

FIG. 1 is a schematic view of aircraft 10. Aircraft 10 includes control units 12A and 12B which are connected to linear sensors 14. Each linear sensor 14 extends from at least one control unit 12 to another location in aircraft 10. A plurality of mounts 16 connect each linear sensor 14 to aircraft 10, for example, to a component of aircraft 10 such as bypass duct 18 (shown in FIG. 2).

In the illustrated embodiment, each linear sensor 14 is a sealed, material-filled tube in which the material reacts to temperature increases. At least one of control unit 12A and 12B can sense the reaction and take appropriate action, if necessary. In alternative embodiments, there can be, for example, wires, cables, conduits, or other elongated members that can be somewhat flexible instead of or in addition to linear sensors 14.

Figure 2:
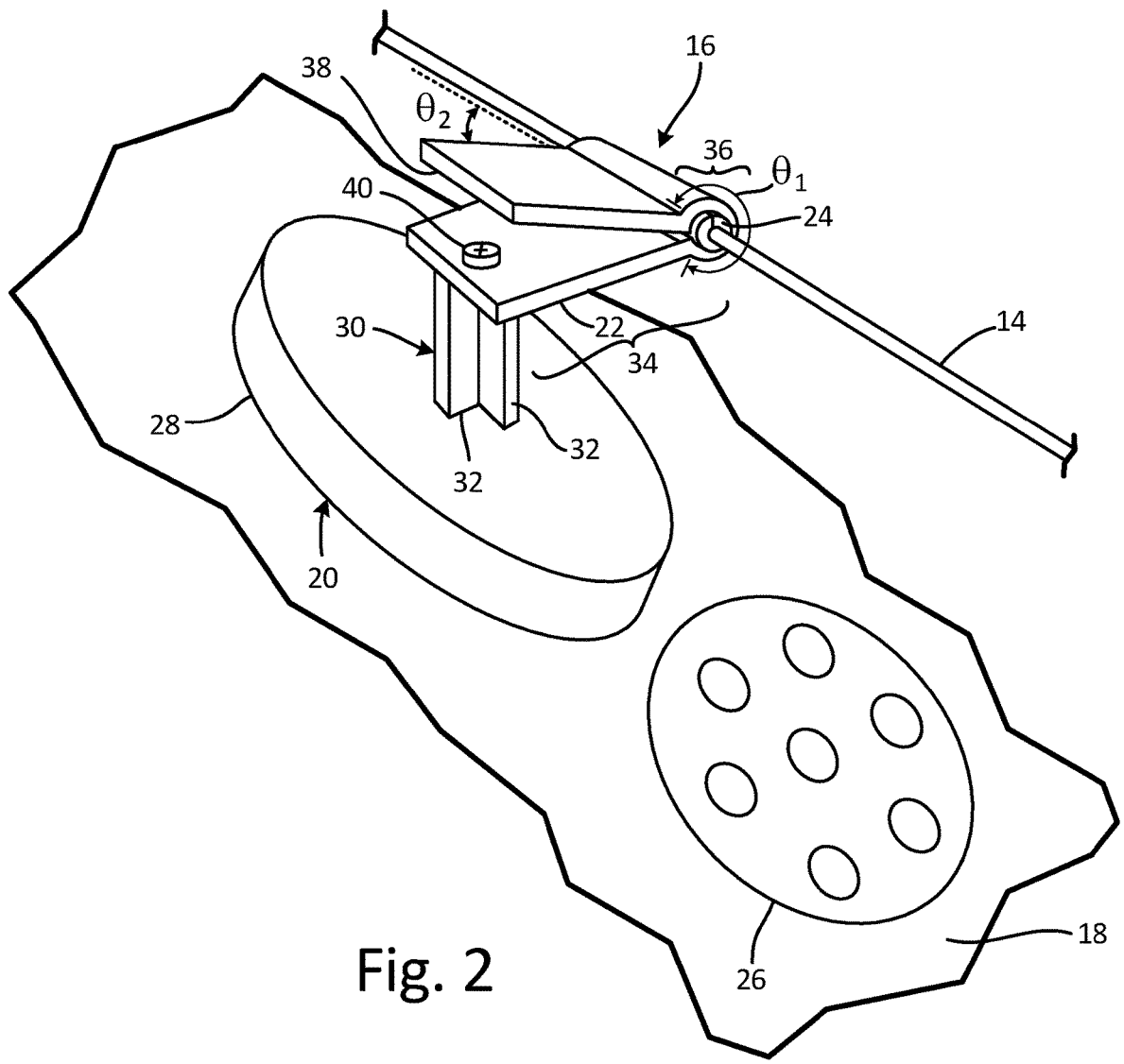
FIG. 2 is a perspective view of a bypass duct with a mount including a bracket and a clip.

FIG. 2 is a perspective view of bypass duct 18 with mount 16 including bracket 20 and clip 22. In the illustrated embodiment, linear sensor 14 is installed in mount 16 using grommet 24 to occupy the space between clip 22 and linear sensor 14, although, in an alternate embodiment, clip 22 and/or linear sensor 14 are sized to function together without grommet 24. Linear sensor 14 is positioned proximate to vent 26 but is spaced apart therefrom in order to significantly thermally isolate linear sensor 14 from bypass duct 18 during normal operation. Vent 26 is a pressure relief valve for bypass duct 18 that would direct a portion of the escaping air during a pressure relief event towards linear sensor 14. When this occurs, the material inside of linear sensor 14 would react to the thermal energy present in the escaping air, which allows at least one of control units 12A and 12B to sense the pressure relief event.

In order to position linear sensor 14 properly with respect to vent 26, mount 16 includes bracket 20 having foot 28, riser 30, and a threaded hole (not shown). Foot 28 is attached to bypass duct 18, for example, using adhesive (not shown), and riser 30 extends outward from foot 28. Riser 30 includes gussets 32 for rigidity, and the threaded hole is located in the opposite end of riser 30 from foot 28.

Furthermore, clip 22 includes connection portion 34, retention portion 36, and tab 38. Connection portion 34 contacts the end of riser 30 and includes a clearance hole (not shown) so that fastener 40 can pass through clip 22 and into bracket 20. Connected to connection portion 34 is retention portion 36. Retention portion 36 has a circular shape that subtends, for example, 300 degrees (as indicated by $\theta_1$). Tab 38 extends towards connection portion 34 from other end of retention portion 36 that is not directly connected to connection portion 34. Tab 38 is positioned proximate to connection portion 34 but is spaced apart therefrom, for example, by 0.64 cm (0.25 in.) at the free end of tab 38.

The components of mount 16 can be comprised of many different materials, for example, polymer materials, and clip 22 can be composed of a high-temperature polymer material. Suitable polymer materials can include polyphenylene sulfide, which is a thermoplastic material with an operating temperature up to about 260° C. (500° F.) wherein the thickness of clip 22 can be, for example, between 0.11 cm and 0.15 cm (0.042 in. and 0.060 in.). Polyphenylene sulfide is suitable because linear sensor 14 is positioned in an environment that is typically between about 65 and 94° C. (150 and 200° F.). Bracket 20 can be comprised of the same or a different material from clip 22. In addition, grommet 24 can be comprised of a polymer material such as, for example, polytetrafluoroethylene.

The space between connection portion 34 and tab 38 and the material chosen for clip 22 allows a user to insert their finger to move tab 38 away from connection portion 34, for example, 45 degrees from the clamping position of tab 38 (as indicated by $\theta_2$). This action enlarges the radius of curvature of retention portion 36, allowing linear sensor 14 and grommet 24 to be inserted or extricated from retention portion 36 without the use of tools. This permits easy repair or replacement of linear sensor 14, and provides for easy access to nearby components such as bypass duct 18. In addition, having tab 38 extend towards connection portion 34 allows the bending of clip 22 to be distributed around at least the entire circumference of retention portion 36. This reduces localized stress and strain, which allows for a lighter weight clip 22 while increasing the lifespan of clip 22 before possible fatigue failure.

Figure 3:
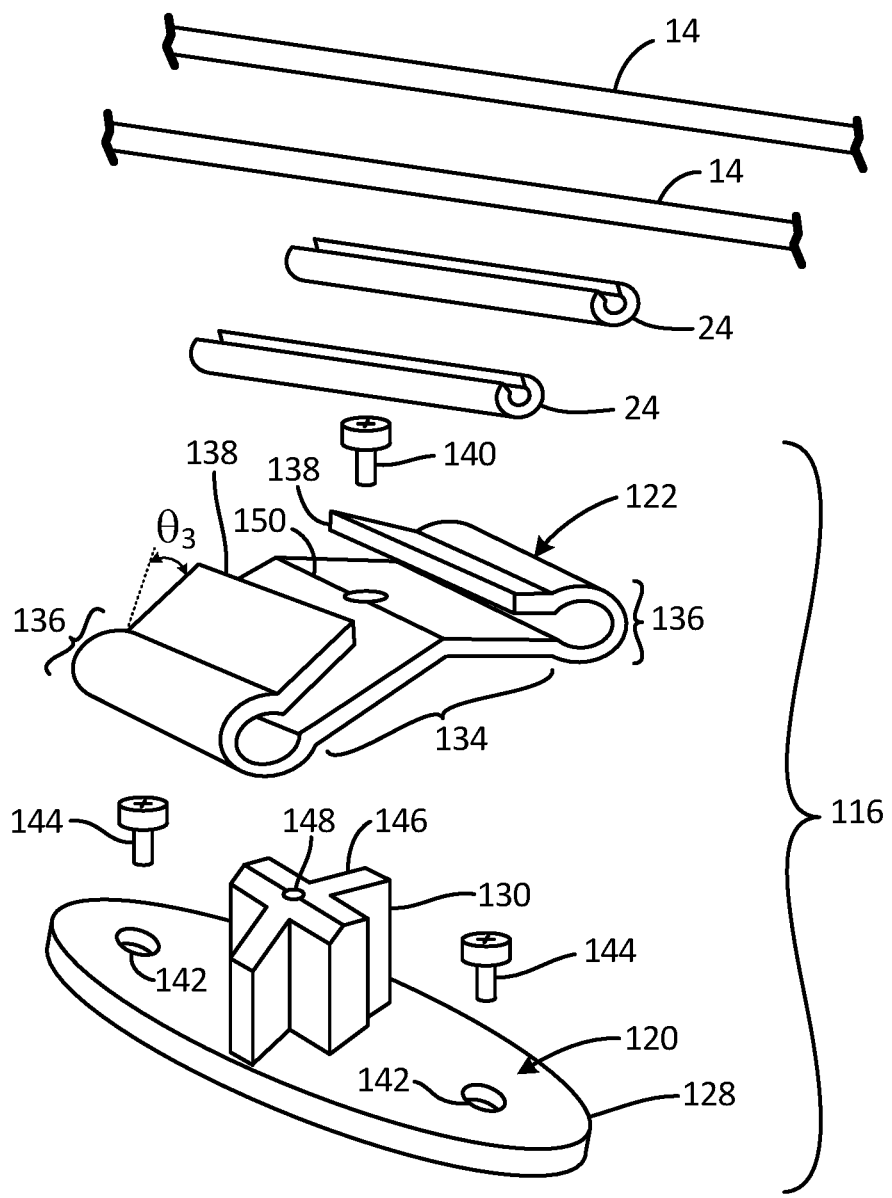
FIG. 3 is an exploded view of an alternate embodiment mount with a dual clip.

FIG. 3 is an exploded view of mount 116 with dual clip 122. Because mount 116 is an alternate embodiment of mount 16 of FIG. 2, the components and features of mount 116 have similar reference numerals to the corresponding component or feature of mount 16, albeit with one hundred added thereto. In the view of FIG. 3, it can be seen that grommets 24 have a slot cut so that they can fit around linear sensors 14. These slots can be squeezed shut when linear sensors 14 and grommets 24 are installed in mount dual clip 122.

In the illustrated embodiment, foot 128 includes two apertures 142 through which two fasteners 144 pass for securing mount 116 to, for example, bypass duct 18 (shown in FIG. 2). In addition, riser 130 includes peaked end 146 for contact with connection portion 134 of dual clip 122. Peaked end 146 slopes towards foot 128 from threaded hole 148 towards the sides of mount 116 that do not include apertures 142, but peaked end 146 remains flat as it extends towards apertures 142. Such a contour matches that of connection portion 134 which includes bend 150. Thereby, when dual clip 122 is fastened to bracket 120, dual clip 122 is prevented from rotating relative to bracket 120.

In addition, clip 122 includes two retention portions 136, each having its own tab 138. The two retention portions 136 are identical but are located opposite of each other with respect to bend 150. Therefore, clip 122 is bilaterally symmetric such that clip 122 is the same when viewed from the front and the back, so clip 122 can be installed forwards or backwards without consequence. Furthermore, each tab 138 extends towards bend 150 but ends significantly before bend 150 to allow fastener 140 to be installed. Each retention portion 136 has a resting configuration that is smaller than when linear sensors 14 and grommets 24 are installed, so in FIG. 3, tabs 138 are located, for example, 5 or 10 degrees closer to connection portion 134 (as indicated by $\theta_3$). Thereby, dual clip 122 exerts a force on linear sensors 14 and grommets 24 when they are installed in dual clip 122.

Figure 4A:
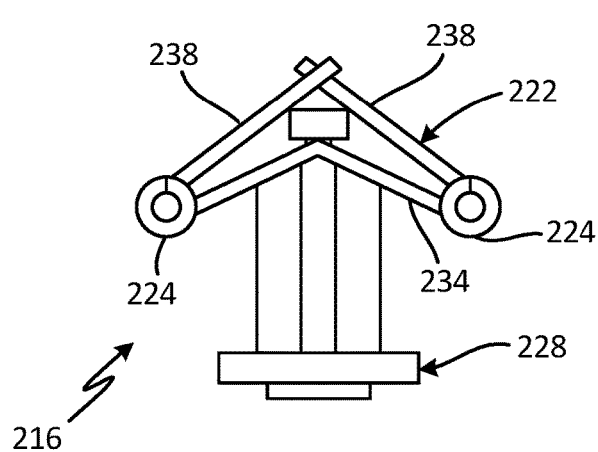
FIG. 4A is a side view of another alternate embodiment mount.
Figure 4B:
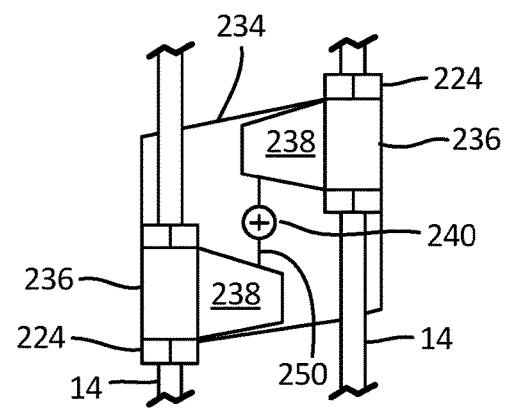
FIG. 4B is a top view of the mount of FIG. 4A.
Figure 4C:
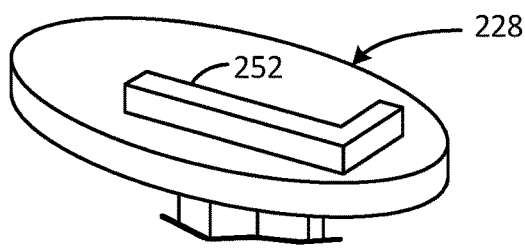
FIG. 4C is a perspective view of the bottom of mount of FIG. 4A.
Figure 4D:
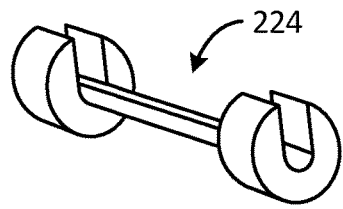
FIG. 4D is a perspective view of a grommet from the mount of FIG. 4A.

FIG. 4A is a side view of another alternate embodiment mount 216, FIG. 4B is a top view of mount 216, FIG. 4C is a perspective view of the bottom of mount 216, and FIG. 4D is a perspective view of grommet 224 from the mount 216. FIGS. 4A-4D will now be discussed simultaneously. Because mount 216 is an alternate embodiment of mounts 16 and 116 of FIGS. 2 and 3, respectively, the components and features of mount 216 have similar reference numerals to the corresponding component or feature of mount 16 or 116, albeit with two hundred or one hundred added thereto, respectively.

In the illustrated embodiment, foot 228 includes ridge 252. Ridge 252 can interface with, for example, a raised rectangular feature (not shown) on bypass duct 18 (shown in FIG. 2). Ridge 252 is an anti-rotation and location feature that is positioned in contact with the raised rectangular feature when installing mount 216. Ridge 252 can be especially beneficial if ridge 252 is only adhered to bypass duct 18.

Mount 216 includes extended and offset tabs 238. Each tab 238 extends from retention portion 236 beyond bend 250. In order to allow installation of fastener 240, tabs 238 are longitudinally offset from each other and are narrowed at the free ends. The configuration of dual clip 222 is radially symmetric so clip 222 can be installed backwards or forwards without consequence.

Each retention portion 236 extends from connection portion 234 towards foot 228 before turning away from foot 228. This configuration provides stress relief in dual clip 222. In addition, grommets 224 have enlarged ends which are the same size as the exterior of retention portions 236. Thereby, grommets 224 cannot slide through retention portions 236 in the event that there are longitudinal forces on linear sensors 14.

Figure 5:
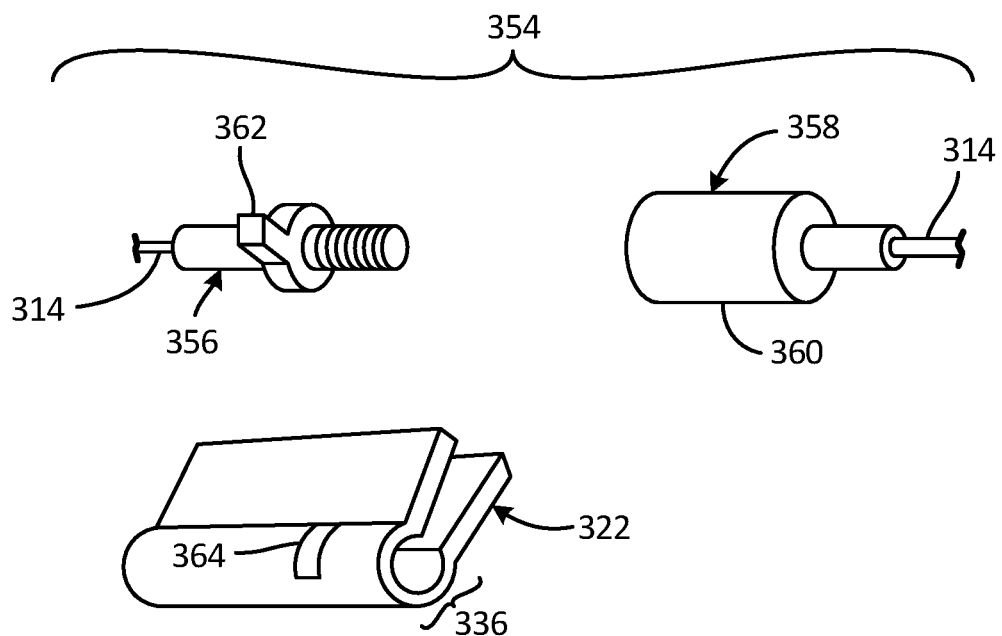
FIG. 5 is a perspective view of an alternate embodiment clip with a disconnected connector.
Figure 6:
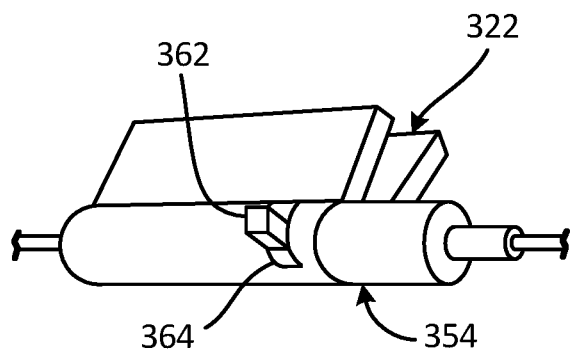
FIG. 6 is a perspective view of the clip of FIG. 5 with a connected connector.

FIG. 5 is a perspective view of an alternate embodiment clip 322 with a disconnected connector 354. FIG. 6 is a perspective view of clip 322 with a connected connector 354. FIGS. 5 and 6 will now be discussed simultaneously. Because clip 322 is an alternate embodiment of clip 22 of FIG. 2, the components and features of clip 322 have similar reference numerals to the corresponding component or feature of clip 22, albeit with one hundred added thereto.

In the illustrated embodiment, linear sensor 314 includes connector 354. Connector 354 allows linear sensor 314 to have two disconnectable segments that can be selectively coupled together. Connector 354 comprises male side 356 and female side 358. Male side 356 includes an exterior thread, and female side 358 includes an interior thread for interfacing with male side 356. In order to turn female side 358 without twisting the female segment of linear sensor 314, female side 358 includes free-spinning portion 360.

In order to prevent the male segment of linear sensor 314 from being rotated as female side 358 is connected to male side 356, male side 356 includes lug 362. Lug 362 extends sideways from the rest of male side 356, and when linear sensor 314 is installed in clip 322, lug 362 extends into window 364 in retention portion 336. The arrangement of lug 362 in window 364 also prevents longitudinal movement of linear sensor 314 with respect to clip 322.

There are also alternative embodiments to clip 322. For example, female side 358 can include lug 362 and be positioned in clip 322 instead of male side 356. For another example, clip 322 can have two retention portions 336, which can result in a similar configuration to clip 122 (shown in FIG. 3). In such an embodiment, both retention portions 336 can hold a male side 356 or one retention portion 336 can hold a male side 356 and the other retention portion 336 can hold a female side 358.

Figure 7:
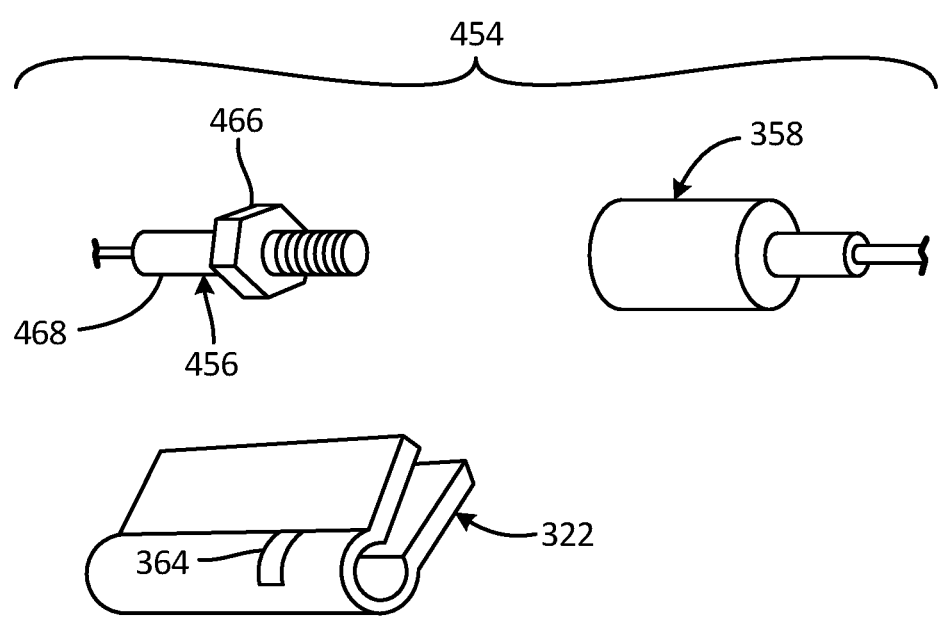
FIG. 7 is a perspective view of a male side of an alternate embodiment disconnected connector.

FIG. 7 is a perspective view of male side 456 of alternate embodiment disconnected connector 454. In the illustrated embodiment, male side 456 includes hex collar 466 which is connected to strain relief 468. Hex collar 466 can interface with a standard hex wrench or similar tool to connect with female side 358. In addition, one or more of the points of hex collar 466 can protrude through window 364 to prevent connector 454 from rotating with respect to clip 322.

Discussion of Possible Embodiments

The following are non-exclusive descriptions of possible embodiments of the present invention.

A mount according to an exemplary embodiment of this disclosure, among other possible things includes: a bracket comprising: a foot; a riser attached to the foot at a first riser end; and a first connecting feature located at a second riser end; and a clip comprising: a connection portion including a second connecting feature for connecting the clip to the bracket; a first retention portion connected to the connection portion, the first retention portion having a curved configuration that subtends at least half of a circle; and a first tab portion that extends from the first retention portion towards the connection portion.

The mount of the preceding paragraph can optionally include, additionally and/or alternatively, any one or more of the following features, configurations and/or additional components:

A further embodiment of the foregoing mount, wherein clip can further comprise: a second retention portion connected to the connection portion, the second retention portion having a curved configuration that subtends at least half of a circle; and a second tab portion that extends from the second retention portion towards the connection portion.

A further embodiment of any of the foregoing mounts, wherein the connection portion can include a bend and the second riser end has a corresponding peak.

A further embodiment of any of the foregoing mounts, wherein the bend can begin at the second connecting feature.

A further embodiment of any of the foregoing mounts, wherein the first tab and the second tab can extend over the bend but are longitudinally offset from the second connecting feature.

A further embodiment of any of the foregoing mounts, wherein the first retention portion and the first tab can be identical to the second retention portion and the second tab.

A further embodiment of any of the foregoing mounts, wherein the first tab and the second tab can not extend over the second connecting feature.

A further embodiment of any of the foregoing mounts, wherein the first and second connecting features can be apertures and the mount can further comprise: a fastener that passes through the apertures to connect the clip to the bracket.

A further embodiment of any of the foregoing mounts, wherein the first tab can not extend over the second connecting feature.

A further embodiment of any of the foregoing mounts, wherein the clip can be bilaterally symmetric.

A further embodiment of any of the foregoing mounts, wherein the clip can be radially symmetric.

A method of using a mount according to an exemplary embodiment of this disclosure, among other possible things includes: connecting the mount to a component of an aircraft, the mount including a clip with a tab that extends over a connection portion of the clip; extending an elongated member from a first location of the aircraft to a second location of the aircraft; inserting a finger between the tab and the connection portion; exerting force on the tab to open the clip; inserting the elongated member into the clip; and ceasing exerting force on the tab to close the clip on the elongated member to secure the elongated member to the component.

The method of the preceding paragraph can optionally include, additionally and/or alternatively, any one or more of the following features, configurations and/or additional components:

A further embodiment of the foregoing method, wherein the method can further comprise: inserting a finger between the tab and the connection portion; exerting force on the tab to open the clip; extracting the elongated member from the clip; and ceasing exerting force on the tab.

A further embodiment of any of the foregoing methods, wherein inserting the elongated member into the clip can comprise inserting a lug extending from the first elongated member into a window in the clip.

A further embodiment of any of the foregoing methods, wherein inserting the elongated member into the clip can comprise inserting connecting a first segment of the elongated member to a second segment of the elongated member.

An aircraft according to an exemplary embodiment of this disclosure, among other possible things includes: a first elongated member that extends from a first end at a first location in the aircraft to a second end at a second location in the aircraft; a component positioned adjacent to a portion of the first elongated member; and a mount connected to the component, the mount including a clip comprising: a connection portion including a first connecting feature for connecting the clip to the component; a retention portion connected to the connection portion, the retention portion having a curved configuration that subtends at least half of a circle; and a tab portion that extends from the retention portion towards the connection portion; wherein the retention portion is clipped on the first elongated member between the first end and the second end to connect the first elongated member to the component.

The aircraft of the preceding paragraph can optionally include, additionally and/or alternatively, any one or more of the following features, configurations and/or additional components:

A further embodiment of the foregoing aircraft, wherein the mount can further comprise a bracket comprising: a foot; a riser attached to the foot at a first riser end; and a second connecting feature located at a second riser end for connecting to the first connecting feature of the clip.

A further embodiment of any of the foregoing aircraft, wherein the component can be a bypass duct.

A further embodiment of any of the foregoing aircraft, wherein the mount can be adhered to the component.

A further embodiment of any of the foregoing aircraft, wherein the mount can be fastened to the component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A mount comprising:
 a bracket comprising:
  a foot;
  a riser attached to the foot at a first riser end; and
  a first connecting feature located at a second riser end; and a clip comprising:
- a connection portion including a second connecting feature for connecting the clip to the bracket, wherein the connection portion includes a bend and the second riser end has a corresponding peak;
- a first retention portion connected to the connection portion, the first retention portion having a curved configuration that subtends at least half of a circle;
- a first tab portion that extends from the first retention portion towards the connection portion;
- a second retention portion connected to the connection portion, the second retention portion having a curved configuration that subtends at least half of a circle; and
- a second tab portion that extends from the second retention portion towards the connection portion.

2. The mount of claim 1, wherein the bend begins at the second connecting feature.

3. The mount of claim 2, wherein the first tab and the second tab extend over the bend but are longitudinally offset from the second connecting feature.

4. The mount of claim 1, wherein the first retention portion and the first tab are identical to the second retention portion and the second tab.

5. The mount of claim 1, wherein the first tab and the second tab do not extend over the second connecting feature.

6. The mount of claim 1, wherein the first and second connecting features are apertures and the mount further comprises:
- a fastener that passes through the apertures to connect the clip to the bracket.

7. The mount of claim 1, wherein the first tab does not extend over the second connecting feature.

8. The mount of claim 1, wherein the clip is bilaterally symmetric.

* * * * *